M. GODEFROY.
RESILIENT WHEEL.
APPLICATION FILED MAY 27, 1914.
1,221,307.
Patented Apr. 3, 1917.
2 SHEETS—SHEET 1.
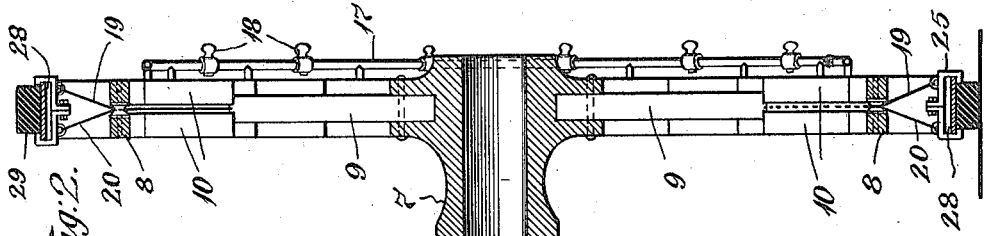
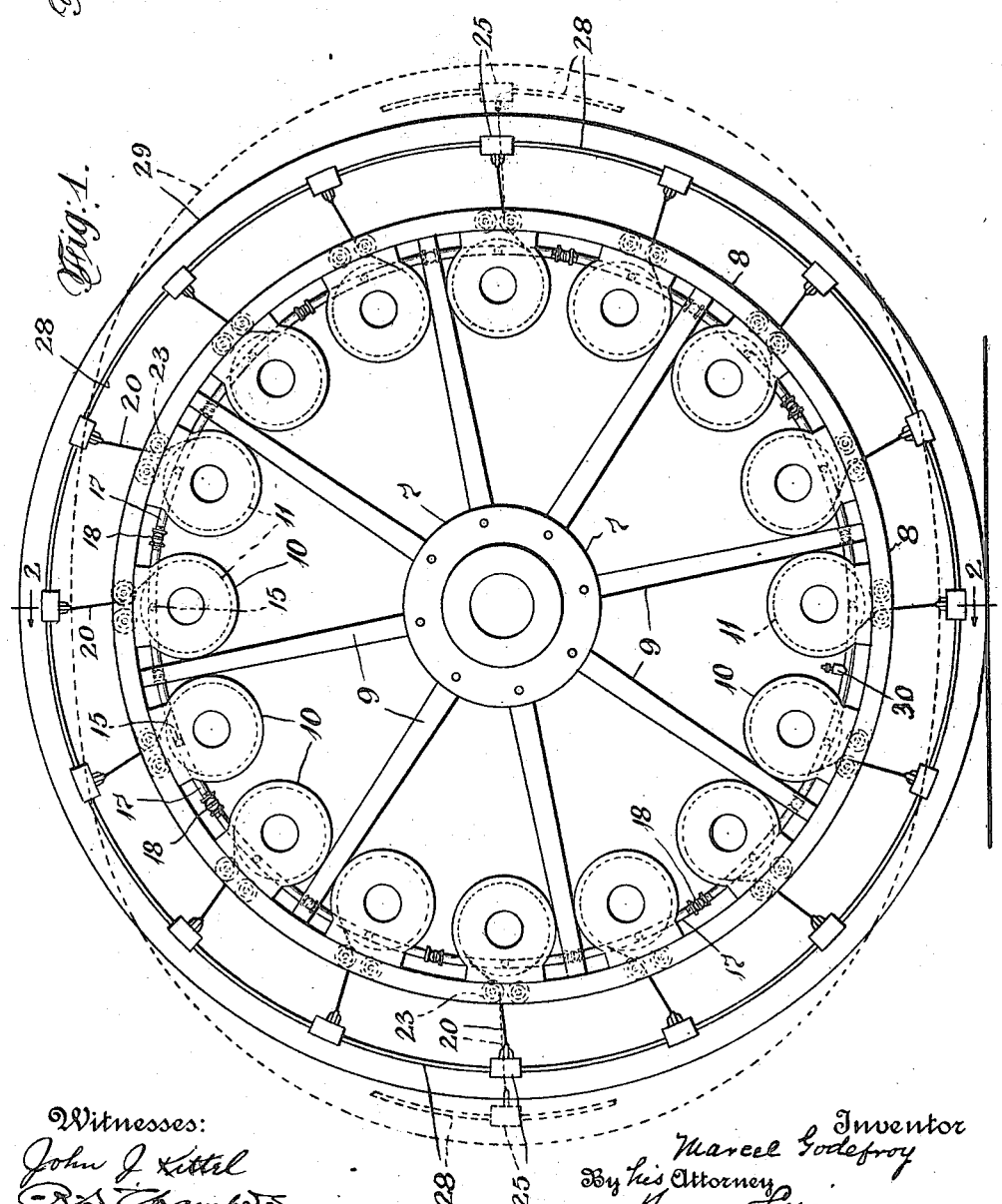

M. GODEFROY.
RESILIENT WHEEL.
APPLICATION FILED MAY 27, 1914.
1,221,307.
Patented Apr. 3, 1917.
2 SHEETS—SHEET 2.
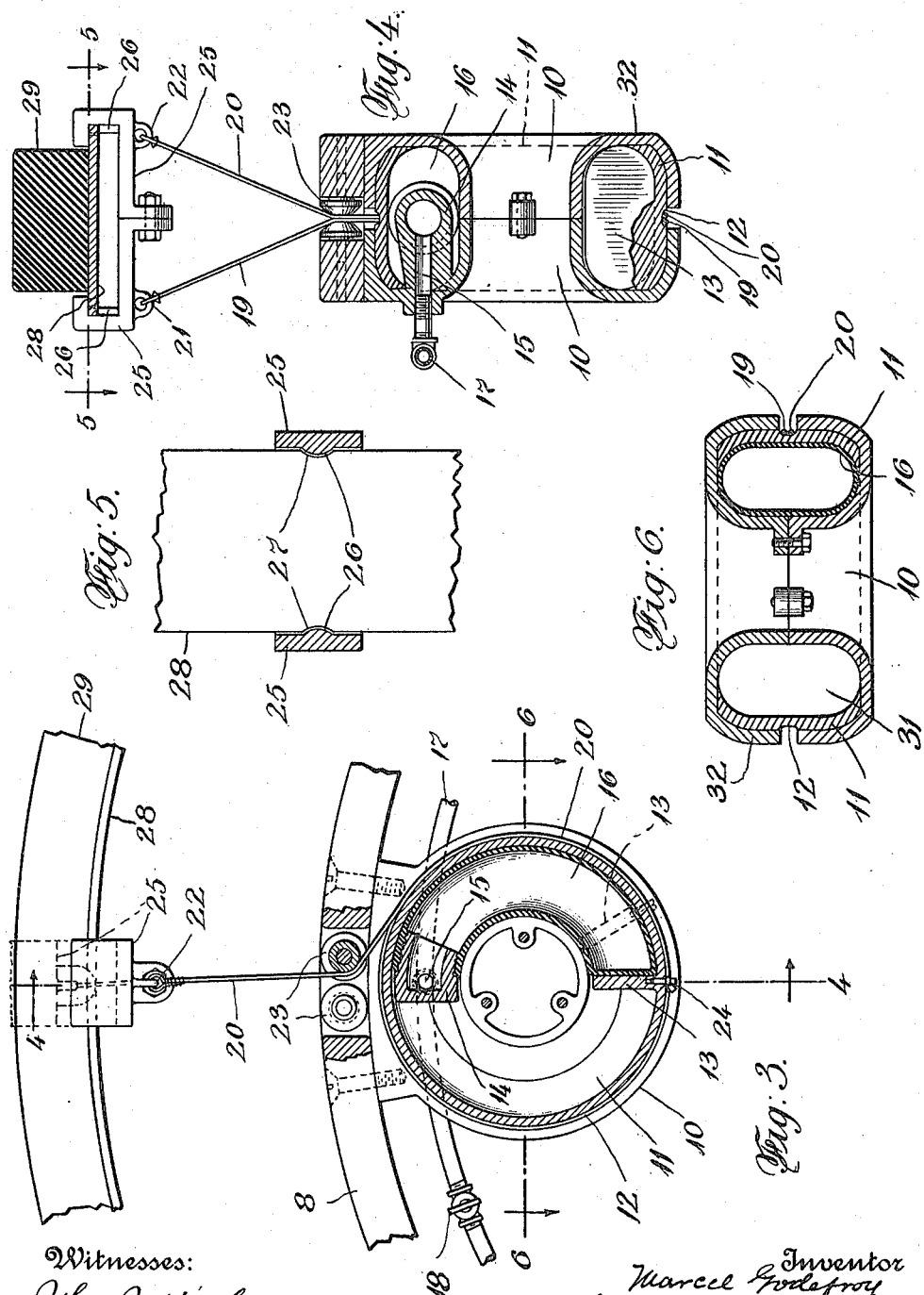
Witnesses:
John J. Kittel
R. S. Chambers
Inventor
Marcel Godefroy
By his Attorney
Howard J. Neiman

UNITED STATES PATENT OFFICE.

MARCEL GODEFROY, OF NEW YORK, N. Y.

RESILIENT WHEEL.

1,221,307.  Specification of Letters Patent.  Patented Apr. 3, 1917.

Application filed May 27, 1914. Serial No. 841,198.

*To all whom it may concern:*

Be it known that I, MARCEL GODEFROY, a citizen of France, and a resident of New York city, in the county of New York and State of New York, have invented certain new and useful Improvements in Resilient Wheels, of which the following is a specification.

My invention relates to a new and useful improvement in resilient wheels comprising broadly a spoked hub carrying a plurality of pneumatic members so connected with a flexible rim that a change in the diameter of the wheel will compress the pneumatic members or allow of their expansion.

By means of my device the entire rim of the wheel changes its position relative to the hub while under pressure, producing a proper distribution of the weight around the hub. By means of the pneumatic members the resiliency of a pneumatic tire is maintained without the dangers of puncture or the wearing away of the rubber tube due to traveling over the road surface. The cost of manufacture and of repair is much less than that incident to the ordinary rubber tires and the absence of springs obviates the danger of bucking and twisting and the decreased resiliency due to the gradual lessening of the spring resiliency.

I take advantage of the resiliency of compressed air cushions which are much more responsive to shocks and inequalities and much more uniform in action than metallic members in the form of springs.

Further by my arrangement of parts the pneumatic members are protected and the possibility of puncture is eliminated and if by accident one of the pneumatic members should become ruptured it can be readily and cheaply replaced without interfering with the other similar members.

One construction of a wheel of my invention is shown in the attached drawings in which similar parts are designated by similar numerals.

Figure 1 illustrates a side elevation of the wheel in a normal condition, the dotted lines illustrating the position of the outer rim under a weight compression.

Fig. 2 is a cross section through 2—2 of Fig. 1.

Fig. 3 is a detail construction view of the pneumatic member, its mode of operation and attachment to the outer and inner rims.

Fig. 4 is a cross section through the line 4—4 of Fig. 3.

Fig. 5 is a cross section through the line 5—5 of Fig. 4.

Fig. 6 is a cross section through the line 6—6 of Fig. 3.

In the wheel construction as shown in the drawings the hub 7 is fixedly attached to the interior rim 8 by means of the spokes 9. At intervals around the inner face of the rim 8 are fixedly attached the circular casings 10. The casing 10 for convenience is composed of two halves fastened together, as shown in Fig. 6, forming a continuous tubular channel 31 encompassed by the walls 32. Within the casing 10 is a movable casing 11 carrying an abutment 13 extending across the circular tubular interior space of the casing 10. A fixed immovable abutment 14 is situated within the tubular space 31 of the casing 10. Between the abutments 13 and 14 and within the tubular interior space 31 of the casing 10 is placed a collapsible and extensible tube 16 preferably of rubber, the rubber tube being open at one end, the open end being fixedly attached over the channeled end of the abutment 14. Within the channeled end of the abutment 14 and opening therein is a tube 15 which extends outwardly and connects with the tube 17. The tube 17 extends completely around the wheel and is connected with each and all of the pneumatic members. The valve 30 can be connected with a compressed air supply for forcing the air into the pneumatic members 16. The valves 18—18 may be opened when the air is introduced into the pneumatic members 16 and then closed in order to disconnect the various pneumatic members from each other. Attached to the abutment 13 at 24 are two flexible members such as ropes, wires or chains extending around the circular casing 11 in the groove 12 to an opening in the outer rim 8 and between the two sheaves 23 outwardly to the exterior flexible rim 28. A means of connecting the flexible members 19 and 20 with the exterior rim is illustrated in Figs. 4 and 5. The flexible members 19 and 20 are pivotally attached to the member 25 at the points 21 and 22. The member 25 is composed of two pieces bolted together as shown in Fig. 4, and has clamping extensions extending around the outer edge of the exterior rim 28, the exterior rim 28 being channeled at 27 to receive the lugs or bosses 26 of the member 25. In order to prevent unnecessary noise the exterior rim 28 may be surrounded by a non-metallic member 29.

The operations in the use of the wheel are as follows: All of the valves 18—18 are opened connecting all of the pneumatic members 16 with the air supply pipe 17. The valve 30 is connected with a source of compressed air and all of the pneumatic members 16 filled with an equal and proper amount of compressed air. All of the valves 18—18 are then closed, thus separating the pneumatic members from each other so that the rupture of one of them will not affect the others. The exterior rim will then be in its neutral position, each point being equidistant from the hub 7. If now a pressure be brought to bear upon the hub 7 the exterior rim 28 will assume the position of the dotted lines in Fig. 1. Thus the vertical diameter of the wheel will be diminished and the horizontal diameter will be correspondingly increased. The flexible members 19 and 20 along the increased diameter will be drawn out, the abutment 13 will be revolved to the position shown in dotted lines in Fig. 3, and the pneumatic member 16 will be compressed against the fixed abutment 14, thus causing a pull upon the exterior rim at those points. The pneumatic members at those points where the diameter of the wheel is decreased will expand, forcing the movable abutment 13 around the interior of the casing 10, and will thus hold the flexible members 19 and 20 in a comparatively tight condition.

It will thus be seen that as the wheel revolves under pressure the pneumatic members will expand or compress according to the changing diameter of the wheel, and that the hub will be subjected to the action of a pneumatic tire and that an increased weight upon the hub will be counteracted by the produced increased compression upon the pneumatic members.

I do not limit myself to the arrangement, number, size, location of parts or the material of their construction as illustrated and mentioned, all of which may be varied without going beyond the scope of my invention as described and claimed.

What I claim is:

1. A resilient wheel comprising a hub, a flexible rim, a plurality of pneumatic receptacles, means for retaining the pneumatic receptacles between the hub and the rim, flexible means attached to the exterior rim and the pneumatic members whereby an elongation of the diameter of the wheel between any two points will produce a compression of the pneumatic members situated between those points, said flexible means preventing the flexible rim from contact with the other parts of the wheel.

2. A resilient wheel comprising a hub, a flexible rim, a plurality of pneumatic receptacles, means for retaining the pneumatic receptacles between the hub and the rim, flexible means attached to the exterior rim and the pneumatic members whereby a shortening of the diameter of the wheel between any two points will cause a compression of the pneumatic members in a direction at right angles to the shortening of the diameter of the wheel and allow an expansion of the pneumatic members situated between the two mentioned points, said flexible means preventing contact between the flexible rim and the rest of the wheel.

3. A resilient wheel comprising a hub, an exterior flexible rim, an interior rim fixedly attached to the hub and spaced from the exterior rim, a plurality of pneumatic receptacles fixedly attached to the interior rim, flexible means connecting the exterior rim with the pneumatic receptacles in such manner that the elongation of the diameter of the wheel at any point will compress the pneumatic receptacles connected to such point, said flexible means preventing the flexible rim from contact with the other elements of the wheel.

4. A resilient wheel comprising a hub, an exterior flexible rim, spider arms or spokes attached to the hub and the interior rim, the exterior rim being spaced from the interior rim, a plurality of receptacles at a fixed distance from the hub each containing a compressible pneumatic member, a flexible member attached to the exterior rim and attached to means whereby the elongation of the diameter of the wheel at any point will compress the pneumatic member upon which it operates, said flexible member suspending the flexible rim free from the other elements of the wheel.

5. A resilient wheel comprising a hub, an interior rim, an exterior flexible rim spaced from the interior rim, spokes integral with the hub and interior rim, a plurality of casings attached to the interior rim each containing a pneumatic flexible receptacle, a flexible member attached to the exterior rim and attached to a movable member within the receptacle carrying the pneumatic member in such a manner that the elongation of the diameter of the wheel will move said movable member causing a compression of the pneumatic receptacle, the flexible rim being spaced from the other elements of the wheel by the flexible connecting members.

6. A resilient wheel comprising a hub, an interior rim spaced from the hub by spokes, an exterior flexible rim spaced from the interior rim, a plurality of casings attached to the interior rim each containing a pneumatic receptacle, all of said casings being connected together by means of a pipe capable of being attached to a source of air compression, the pneumatic receptacles being separated from each other by means of cocks capable of being opened and closed, each casing carrying within it a movable and a fixed abutment, a flexible member attached to the movable abutment passing partially around the casing through the inner rim and attached to the outer rim in such a maner that the elongation of the axis of the wheel will pull said flexible member outwardly and compress the pneumatic member between the movable and fixed abutments, and a resilient member surrounding the outer flexible rim.

Signed at New York city, in the county of New York, and State of New York, this 26th day of May, 1914.

MARCEL GODEFROY.

Witnesses:
R. S. CHAMBERS,
RITA LYNCH.

Copies of this patent may be obtained for five cents each, by addressing the "Commissioner of Patents, Washington, D. C."